United States Patent
Luo

(10) Patent No.: US 10,593,110 B2
(45) Date of Patent: Mar. 17, 2020

(54) METHOD AND DEVICE FOR COMPUTING A PATH IN A GAME SCENE

(71) Applicant: NetEase (Hangzhou) Network Co., Ltd., Hangzhou (CN)

(72) Inventor: Bing Luo, Hangzhou (CN)

(73) Assignee: NETEASE (HANGZHOU) NETWORK CO., LTD., Hangzhou, Zhejiang Province (CN)

( * ) Notice: Subject to any disclaimer, the term of this patent is extended or adjusted under 35 U.S.C. 154(b) by 0 days.

(21) Appl. No.: 15/609,027

(22) Filed: May 31, 2017

(65) Prior Publication Data
US 2018/0012403 A1    Jan. 11, 2018

(30) Foreign Application Priority Data
Jul. 7, 2016  (CN) .......................... 2016 1 0545167

(51) Int. Cl.
*G06T 17/20*    (2006.01)
*A63F 13/355*    (2014.01)
(Continued)

(52) U.S. Cl.
CPC ............ *G06T 17/20* (2013.01); *A63F 13/355* (2014.09); *A63F 13/358* (2014.09);
(Continued)

(58) Field of Classification Search
CPC ..... G06T 17/20; G06T 15/005; A63F 13/358; A63F 13/56; G06K 9/46
See application file for complete search history.

(56) References Cited

U.S. PATENT DOCUMENTS

| 2005/0071306 A1* | 3/2005 | Kruszewski | A63F 13/10 706/47 |
| 2008/0088626 A1* | 4/2008 | Habe | G06T 9/001 345/427 |

(Continued)

FOREIGN PATENT DOCUMENTS

| CN | 101174278 A | 5/2008 | |
| CN | 101241507 A * | 8/2008 | ........... G06Q 10/047 |

(Continued)

OTHER PUBLICATIONS

The Second Office Action in Chinese Patent Application No. 201610545167.5, dated Jul. 10, 2019.
(Continued)

*Primary Examiner* — William H McCulloch, Jr.
*Assistant Examiner* — Yingchuan Zhang
(74) *Attorney, Agent, or Firm* — Yunling Ren

(57) ABSTRACT

A method and device for computing a path in a game scene according to embodiments of the present disclosure, comprising: dividing the game scene into a plurality of first areas; dividing each of the first areas into a plurality of convex polygons, based on features of the game scene; combining adjacent convex polygons into a plurality of second areas; computing a first path from a first point to a second point, said first path passing through a group of second areas of said plurality of second areas; and computing, based on the first path, a second path from the first point to the second point, said second path passing through a group of convex polygons of said group of second areas.

9 Claims, 5 Drawing Sheets

(51) Int. Cl.
  *A63F 13/428*  (2014.01)
  *A63F 13/358*  (2014.01)
  *A63F 13/56*  (2014.01)
  *G06T 15/00*  (2011.01)

(52) U.S. Cl.
  CPC ............ *A63F 13/428* (2014.09); *A63F 13/56* (2014.09); *G06T 15/005* (2013.01); *A63F 2300/534* (2013.01); *A63F 2300/538* (2013.01); *A63F 2300/66* (2013.01)

(56) References Cited

U.S. PATENT DOCUMENTS

| | | | | |
|---|---|---|---|---|
| 2013/0322702 | A1* | 12/2013 | Piemonte | .............. G06T 15/005 382/113 |
| 2014/0073435 | A1* | 3/2014 | Liu | ....................... A63F 13/822 463/42 |

FOREIGN PATENT DOCUMENTS

| | | | | |
|---|---|---|---|---|
| CN | 101241507 | A | | 8/2008 |
| CN | 102074049 | A | | 5/2011 |
| CN | 103198234 | A | | 7/2013 |
| CN | 104410661 | A | | 3/2015 |
| CN | 104548597 | A * | 4/2015 | ............. A63F 13/56 |
| CN | 104548597 | A | | 4/2015 |
| CN | 104613976 | A | | 5/2015 |
| CN | 104867402 | A | | 8/2015 |

OTHER PUBLICATIONS

Qiong Chen, "Research of Four Terrain Transformation Algorithms Based on Creator", System Simulation Technology & Application, vol. 10, pp. 147-150.

* cited by examiner

METHOD AND DEVICE FOR COMPUTING A PATH IN A GAME SCENE

CROSS-REFERENCE TO RELATED APPLICATIONS

This application claims priority to Chinese Patent Application No. 201610545167.5, filed on Jul. 7, 2016, the entire contents of which are incorporated herein by reference.

TECHNICAL FIELD

Embodiments of the present disclosure relate to computer technology, and in particular, relate to a method and system for computing a path in a game scene.

BACKGROUND

The purpose of this part is to provide background or context for embodiments of the present disclosure set forth in the claims. The description herein is not intended to be an admission of being a prior art.

In a game, in order to find the shortest reachable path between two points, i.e. automatic path-finding, a server will generate a NavMesh (navigation mesh) for a game scene. The NavMesh can be an abstract data structure, consisting of a series of two dimensional convex polygons which represent reachable areas in the game scene. The NavMesh can be created off-line. When a server is loading a game scene, the NavMesh that corresponds to the game scene can be loaded into a memory simultaneously, and then a path-finding algorithm can be applied to find the suitable path. When the game scene becomes larger, the NavMesh grows larger accordingly, and lots of memory will be consumed after the Navmesh is loaded. On the other hand, when the NavMesh grows larger, more nodes would have to be traversed. The huge amount of computation will delay the time of the automatic path-finding. As a result, the consumption of a game server's resources will increase, and game images might get stuck. These make it difficult to provide real-time images/video of high quality for users, and will cause unsatisfying user experience.

SUMMARY

For the conventional method and device for automatic path-finding, when a game scene becomes larger, the NavMesh grows larger accordingly, and lots of memory will be consumed after the Navmesh is loaded. On the other hand, when the NavMesh grows larger, more nodes would have to be traversed. The huge amount of computation will delay the automatic path-finding. As a result, the consumption of server's resources will increase, and game images may get stuck. These make it difficult to provide real-time images/video of high quality for users, and it's a quite troublesome process.

Therefore, it is quite desirable to provide an improved method and device for computing a path in a game scene, so as to remarkably decrease the consumption of server's memory and the amount of computation, shorten the operation time to improve computing efficiency, and prevent the game images from getting stuck so as to provide a game scene of high quality.

According to the first aspect of the present disclosure, a method for computing a path in a game scene is provided, comprising: dividing the game scene into a plurality of first areas; dividing each of the first areas into a plurality of convex polygons, based on features of the game scene; combining adjacent convex polygons into a plurality of second areas; computing a first path from a first point to a second point, said first path passing through a group of second areas of said plurality of second areas; and computing, based on the first path, a second path from the first point to the second point, said second path passing through a group of convex polygons of said group of second areas.

According to the method for computing a path in a game scene in the aforesaid implementation of the present disclosure, wherein dividing the game scene into a plurality of first areas comprises: dividing the game scene into a plurality of first areas of the same size, based on the size of the game scene; and recording vertex coordinates of each of the plurality of first areas.

According to the method for computing a path in a game scene in any one of the aforesaid implementations of the present disclosure, wherein the features of said game scene comprise: geographic features and/or character features.

According to the method for computing a path in a game scene in any one of the aforesaid implementations of the present disclosure, wherein dividing each of the first areas into a plurality of convex polygons, based on features of the game scene comprises: determining unreachable areas and reachable areas in each of the first areas, based on the geographic features and/or character features of the game scene; and dividing the reachable area in each of the first areas into a plurality of convex polygons.

According to the method for computing a path in a game scene in any one of the aforesaid implementations of the present disclosure, wherein dividing each of the first areas into a plurality of convex polygons, based on features of the game scene comprises: determining the number of convex polygons being divided in each of the first areas, the number of vertexes of each of the convex polygons, and/or the vertex coordinates of each of the convex polygons, based on the geographic features and/or character features of the game scene.

According to the method for computing a path in a game scene in any one of the afore said implementations of the present disclosure, the method further comprises: determining a list of adjacent convex polygons for each convex polygon in each of the first areas, based on the number of vertexes of each of the convex polygons and/or the vertex coordinates of each of the convex polygons.

According to the method for computing a path in a game scene in any one of the aforesaid implementations of the present disclosure, wherein combining adjacent convex polygons into a plurality of second areas comprises: combining adjacent convex polygons in each of the first areas into a plurality of second areas, based on the determined list of adjacent convex polygons for each convex polygon in each of the first areas.

According to the method for computing a path in a game scene in any one of the aforesaid implementations of the present disclosure, the method further comprises: determining a list of adjacent second areas for each second area, based on the list of the adjacent convex polygons for each convex polygon in each of the second areas.

According to the method for computing a path in a game scene in any one of the aforesaid implementations of the present disclosure, the method comprises: computing a central coordinate for each of the convex polygons, based on coordinates of each of the convex polygons included in each of the second areas; and computing a mean value for the central coordinates of the convex polygons included in each of the second areas, wherein the mean value is used as the coordinate for respective second areas.

According to the method for computing a path in a game scene in any one of the aforesaid implementations of the present disclosure, the method further comprises: determining the first area, convex polygon and second area to which said first point belongs, based on the coordinate of said first point; and determining the first area, convex polygon and second area to which said second point belongs, based on the coordinate of said second point.

According to the method for computing a path in a game scene in any one of the aforesaid implementations of the present disclosure, the step of computing a first path from a first point to a second point, said first path passing through a group of second areas of said plurality of the second areas comprises: computing a first path, from a first point to a second point, that passes through a group of adjacent second areas of said plurality of the second areas, based on the second area to which said first point belongs and the list of adjacent second areas of said second area, the second area to which said second point belongs and the list of adjacent second areas of said second area, and coordinates of each second area.

According to the method for computing a path in a game scene in any one of the aforesaid implementations of the present disclosure the step of computing, based on the first path, a second path from the first point to the second point, said second path passing through a group of convex polygons of said group of the second areas comprises: computing a second path, from a first point to a second point, that passes through a group of adjacent convex polygons of said group of adjacent second areas, said computation is based on said first path, the convex polygon to which said first point belongs, the convex polygon to which said second point belongs, the list of convex polygons that adjacent to the convex polygons in the group of second areas being passed through by said first path, and the central coordinate of each convex polygon.

According to the second aspect of the present disclosure, a device for computing a path in a game scene is provided, comprising: a first dividing module configured to divide the game scene into a plurality of first areas; a second dividing module configured to divide each of the first areas into a plurality of convex polygons, based on features of the game scene; a combining module configured to combine adjacent convex polygons into a plurality of second areas; a first computing module configured to compute a first path from a first point to a second point, said first path passing through a group of second areas of said plurality of second areas; and a second computing module configured to compute, based on the first path, a second path from the first point to the second point, said second path passing through a group of convex polygons of said group of second areas.

According to the device for computing a path in a game scene in the aforesaid implementation of the present disclosure wherein said first dividing module comprises: a first dividing sub-module configured to divide the game scene into a plurality of first areas of the same size, based on the size of the game scene; a recording module configured to record vertex coordinates of each of the plurality of first areas.

According to the device for computing a path in a game scene in any one of the aforesaid implementations of the present disclosure, wherein the features of said game scene comprises: geographic features and/or character features.

According to the device for computing a path in a game scene in any one of the aforesaid implementations of the present disclosure, wherein said second dividing module comprises: a first determining sub-module configured to determine unreachable areas and reachable areas in each of the first areas, based on the geographic features and/or character features of the game scene; a second dividing sub-module configured to divide the reachable area in each of the first areas into a plurality of convex polygons.

According to the device for computing a path in a game scene in any one of the aforesaid implementations of the present disclosure, wherein said second dividing module is configured to determine the number of convex polygons being divided in each of the first areas, the number of vertexes of each of the convex polygons, and/or the vertex coordinates of each of the convex polygons, based on the geographic features and/or character features of the game scene.

According to the device for computing a path in a game scene in any one of the aforesaid implementations of the present disclosure, the device further comprises: a first list determining module configured to determine a list of adjacent convex polygons for each convex polygon in each of the first areas, based on the number of vertexes of each of the convex polygons and/or the vertex coordinates of each of the convex polygons.

According to the device for computing a path in a game scene in any one of the aforesaid implementations of the present disclosure, wherein said combining module is configured to combine adjacent convex polygons in each of the first areas into a plurality of second areas, based on the determined list of adjacent convex polygons for each convex polygon in each of the first areas.

According to the device for computing a path in a game scene in any one of the aforesaid implementations of the present disclosure, the device further comprises: a second list determining module configured to determine a list of adjacent second areas for each second area, based on the list of the adjacent convex polygons for each convex polygon in each of the second areas.

According to the device for computing a path in a game scene in any one of the aforesaid implementations of the present disclosure, the device further comprises: a fourth computing module configured to compute a central coordinate for each of the convex polygons, based on coordinates of each of the convex polygons included in each of the second areas; and a fifth computing module configured to compute a mean value for the central coordinates of the convex polygons included in each of the second areas, wherein the mean value is used as the coordinate for respective second area.

According to the device for computing a path in a game scene in any one of the aforesaid implementations of the present disclosure, the device further comprises: a second determining module configured to determine the first area, convex polygon and second area to which said first point belongs, based on the coordinate of said first point; and a third determining module configured to determine the first area, convex polygon and second area to which said second point belongs, based on the coordinate of said second point.

According to the device for computing a path in a game scene in any one of the aforesaid implementations of the present disclosure, wherein the first computing module is configured to: compute a first path, from a first point to a second point, that passes through a group of adjacent second areas of said plurality of the second areas, based on the second area to which said first point belongs and the list of adjacent second areas of said second area, the second area to which said second point belongs and the list of adjacent second areas of said second area, and coordinates of each second area.

According to the device for computing a path in a game scene in any one of the aforesaid implementations of the present disclosure, wherein said second computing module is configured to compute a second path, from a first point to a second point, that passes through a group of adjacent convex polygons of said group of adjacent second areas, said computation is based on said first path, the convex polygon to which said first point belongs, the convex polygon to which said second point belongs, the list of convex polygons that adjacent to the convex polygons in the group of second areas being passed through by said first path, and the central coordinate of each convex polygon.

According to the methods and devices for computing a path in a game scene in the implementations of the present disclosure, a fine-grained NavMesh is generated by dividing the game scene into a plurality of first areas and dividing each first area into a plurality of convex polygons, and then a coarse-grained NavMesh is generated by combining adjacent convex polygons into a plurality of second areas. When computing a path in a game scene, it's feasible for the present disclosure to acquire a first path by loading the coarse-grained NavMesh only, and then acquire an accurate path by loading the fine-grained NavMesh traversed by said first path. This remarkably decreases the consumption of server's memory and the amount of computation, shortens the operation time to improve computing efficiency, and prevents the game images from getting stuck so as to provide a game scene of high quality.

BRIEF DESCRIPTION OF THE DRAWINGS

The above and other purposes, features and advantages of the exemplary embodiments of the present disclosure will be readily understood by referring to the drawings and reading the following detailed description. In the drawings, several embodiments of the present disclosure are shown in a way of example but not limitation.

In the accompanying drawings, same or corresponding reference numbers indicate same or corresponding parts.

DETAILED DESCRIPTION OF THE EMBODIMENTS

The principle and spirit of the present invention will be described below with reference to a number of exemplary embodiments. It is to be understood that, these embodiments are provided solely to enable those skilled in the art to better understand the invention, and thus to implement the invention, rather than being used as limitations to the scope of the invention. Rather, these embodiments are provided so that this disclosure will be thorough and complete, and will fully convey the scope of the disclosure to those skilled in the art.

It can be understood by a person skilled in the art that, embodiments of the present invention can be embodied as a system, an apparatus, a device, a method or a computer program product. Therefore, the disclosure can be specifically implemented in hardware, software (including firmware, resident software, microcode etc.) or a combination thereof.

According to embodiments of the present invention, a method and device for computing a path in a game scene is provided.

It should be understood that, the numbers of any elements in the figures are merely exemplary, rather than limiting; and names are used for distinguishing only, no restriction shall be made to the meaning of the names.

The principle and spirit of present invention will be stated in detail with reference to several embodiments of the present invention.

Overview

The inventor found that, firstly, a game scene can be divided into a plurality of first areas, which may have a same size. Then, each first area can be divided into a plurality of convex polygons, which can be used as a first layer of NavMesh, known as fine-grained NavMesh. Adjacent convex polygons can be combined into a plurality of second areas, which are used as a second layer of NavMesh, known as coarse-grained NavMesh. A first path, between two points, that passing through the coarse-grained NavMesh can be computed. The fine-grained NavMesh that corresponds to the first path can be loaded to compute a second path, which is between the two points and passes through the fine-grained NavMesh. The second path is used as an accurate path. In this way, in the automatic path-finding of a relatively large game scene, the memory consumed by NavMesh can be decreased, while the time and amount of computation for the path-finding can be reduced.

After the basic principle of the present invention is introduced, various exemplary embodiments will be introduced below in detail.

Exemplary Method

A method for computing a path in a game scene according to an embodiment of the present invention is described with reference to FIG. 1.

Figure 1:
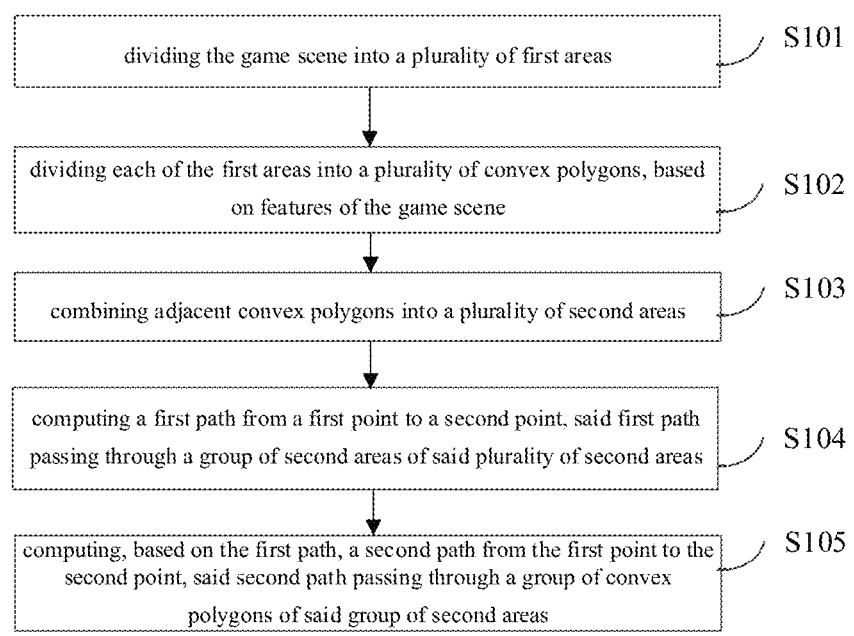
FIG. 1 is a schematic diagram exemplarily illustrating a method for computing a path in a game scene according to an embodiment of the present disclosure.

FIG. 1 is a schematic diagram exemplarily illustrating a method for computing a path in a game scene according to an embodiment of the present disclosure.

In some embodiments, a game scene can be the images that generated based on game plots, and may include character features and/or geographic features. In a game scene, some areas are set as reachable areas, e.g., flat grounds, houses, etc.; while other areas are set as unreachable areas, e.g., mountains, seas, etc. Alternatively, a path can be a route in the game scene from one point to another point. Alternatively, a path can be a route that can only pass through reachable areas in the game scene.

As shown in FIG. 1, a method 100 is provided, which includes: step S101, dividing said game scene into a plurality of first areas.

In some embodiments, step S101 includes: dividing the game scene into a plurality of first areas of the same size, based on the size of the game scene; and recording vertex coordinates of each of the plurality of first areas.

For example, for a game scene with a size of 15000 m×10000 m, it is assumed that the large game scene is a space of 15000 m×10000 m, wherein the range of axis x is [0, 15000], and the range of axis z is [0, 10000]. The game scene can be divided into a plurality of first areas of the same size. For example, the game scene can be divided, in the x-z plane, into 150×100 square areas with a same size of 100 m×100 m, such as the four square areas in FIG. 2, i.e. areas A-D. For each first area, if the range of axis y (the height of a game scene) is not considered, the x and z coordinates of the bottom-left corner of each square can be recorded to distinguish the position of each square area in the game scene. Alternatively, the first areas can be of other shapes, such as rectangles.

As shown in FIG. 1, said method 100 includes: step S102, dividing each of the first areas into a plurality of convex polygons, based on features of the game scene.

In some embodiments, said features of the game scene include: geographic features and/or character features in the game scene. Optionally, the geographic features may include flat grounds, mountains, seas, houses, etc. in the game scene. Optionally, the character features may be the objects controlled by a user for representing the actions/movement of the user in the game scene.

In some embodiments, step S102 includes: determining unreachable areas and reachable areas in each of the first areas, based on the geographic and/or character features of the game scene; and dividing the reachable area in each of the first areas into a plurality of convex polygons.

The unreachable and reachable areas in each of the first areas can be determined based on geographic features and/or character features of the game scene. Optionally, a character feature may include feature values of a specific character, e.g., height, radius, largest climbable angle of slopes, leg raising height etc. of a character that walking in the game scene. Optionally, a geographic feature may include height, width, depth, or other features of a scene at which a user locates. For example, when the geographic feature of a game scene is a door having a height of 1.5 m, the area at which the door locates is an unreachable area for a character having a height of 2 m. If the radius (or width) of a character is 1 m, and the width of an alley (or a narrow street) in the game scene is 0.8 m, the area at which the alley locates is an unreachable area. If the largest climbable angle of slopes of a character is 45 degrees and a cliff is 75 degrees, the area at which the cliff locates is an unreachable area. If the leg raising height of a character is 0.5 m and steps of a stair have a height of 0.7 m, the area at which the stair locates is an unreachable area.

Optionally, a path in a game scene can only pass through reachable areas and cannot pass through unreachable areas. Therefore, in order to compute a path in a game scene, reachable areas in each first area are divided into a plurality of convex polygons, which can be used as a first layer of NavMesh, known as fine-grained NavMesh. For example, the reachable areas of area A can be divided into convex polygons a-g.

In some embodiments, step S102 includes: determining the number of convex polygons being divided in each of the first areas, the number of vertexes of each of the convex polygons, and/or the vertex coordinates of each of the convex polygons, based on the geographic and/or character feature of the game scene. Optionally, if the current first area in the game scene is relatively flat, e.g., a plain, the number of vertexes of each of the convex polygons can be set larger, such as a hexagon. If the geographic feature of the current first area in the game scene is relatively complex, e.g., an area with its height changing dramatically, the first area can be divided into triangles in order to record said changes of height. Optionally, the number of convex polygons in each first area and the number of vertexes of each of the convex polygons can be set in advance, for example, the maximum number of vertexes of convex polygons can be set as 6, i.e. the number of vertexes of each of the convex polygons can be a value from 3 to 6.

Figure 2:
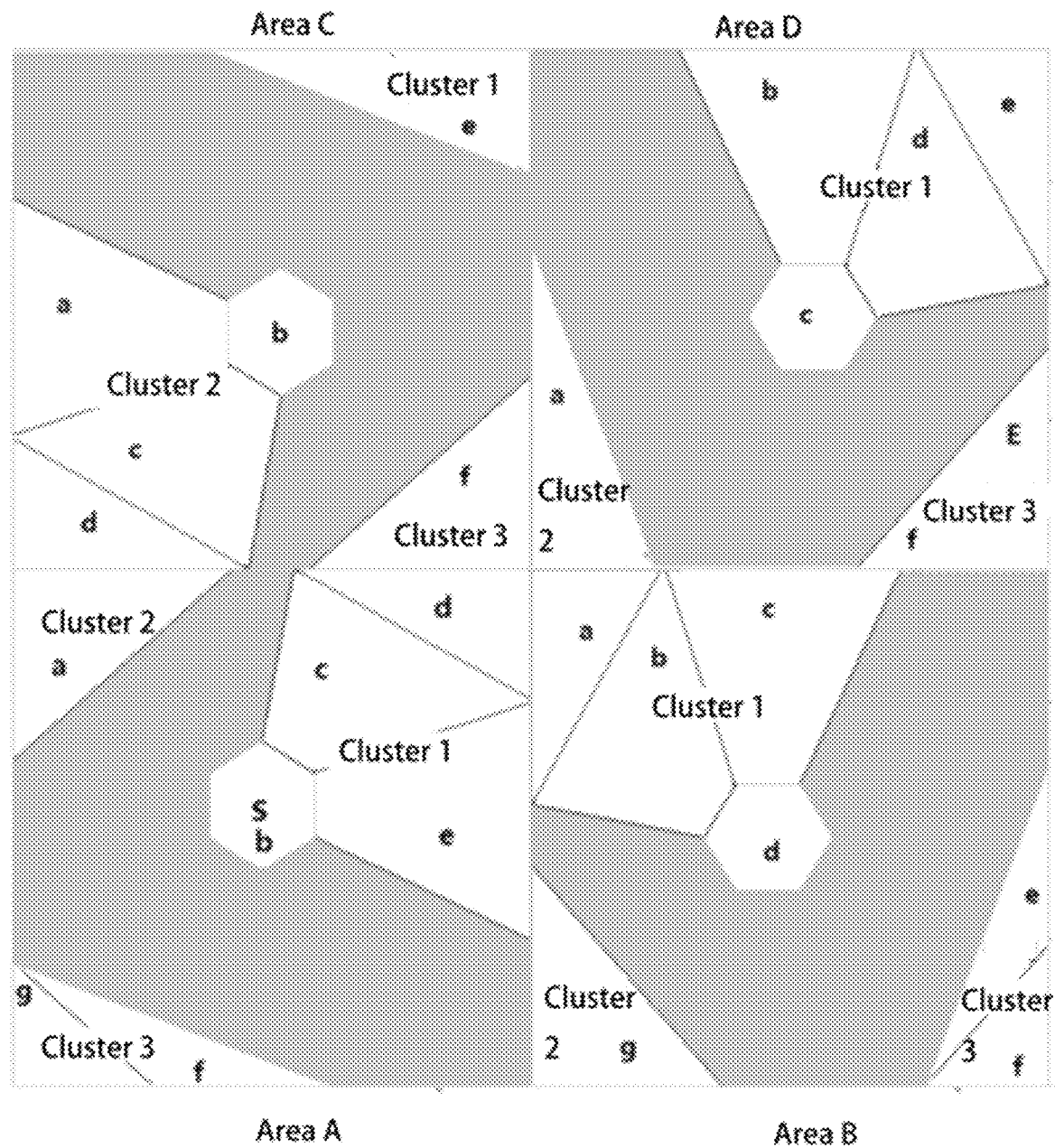
FIG. 2 is a schematic diagram of a game scene according to an embodiment of the present disclosure.

In some embodiments, the method 100 further includes: determining a list of adjacent convex polygons for each convex polygon in each of the first areas, based on the number of vertexes of each of the convex polygons and/or the vertex coordinates of each of the convex polygons. As shown in FIG. 2, for convex polygon a in area A, it can be seen from the number of vertexes and/or the vertex coordinates of convex polygon a that, there are no convex polygons in area A that are adjacent to convex polygon a. For convex polygon b in area A, it can be seen from the number of vertexes and/or the vertex coordinates of convex polygon b that, the convex polygons in area A that are adjacent to convex polygon b include convex polygons c and e. For convex polygon c in area A, it can be seen from the number of vertexes and/or the vertex coordinates of convex polygon c that, the convex polygons in area A that are adjacent to convex polygon c include convex polygons b, d and e. For convex polygon e in area A, it can be seen from the number of vertexes and/or the vertex coordinates of convex polygon e that, the convex polygons in area A that are adjacent to convex polygon e include convex polygons b, c and d. The rest can be done in a same manner.

As shown in FIG. 1, the method 100 includes step S103: combining adjacent convex polygons into the plurality of second areas.

In some embodiments, step S103 may include: combining adjacent convex polygons in each of the first areas into a plurality of second areas, based on the determined list of the convex polygons adjacent to each other in each of the first areas.

Optionally, according to the determined list of the convex polygons adjacent to each other in each of the first areas, for example, in area A, convex polygon b is adjacent to convex polygons c and e, convex polygon c is adjacent to convex polygons b, d and e, convex polygons e is adjacent to convex polygon b, c and d, and thus it can be seen that, in area A, the adjacent convex polygons include convex polygons b, c, d and e. Similarly, the adjacent convex polygons further include convex polygons f and g. Thus, area A includes three second areas: polygon cluster 1, including convex polygons b, c, d and e; polygon cluster 2, including convex polygons f and g; and polygon cluster 3, including convex polygon a. Similarly, area B includes three second areas: polygon cluster 1, including convex polygons a-d; polygon cluster 2, including convex polygon g; and polygon cluster 3, including convex polygons e and f. Area C includes three second areas: polygon cluster 1, including convex polygon e; polygon cluster 2, including convex polygons a-d; and polygon cluster 3, including convex polygon f. Area D includes three second areas: polygon cluster 1, including convex polygons b-e; polygon cluster 2, including convex polygon a; and polygon cluster 3, including convex polygon f.

In some embodiments, the method 100 further includes: determining a list of adjacent second areas for each second area, based on the list of the adjacent convex polygons for each convex polygon in each of the second areas. In some embodiments, the list of the adjacent convex polygons for each convex polygon may also include the number of vertexes and/or the vertex coordinates of each convex polygon. A list of adjacent second areas for each second area can be determined based on the number of vertexes and/or the vertex coordinates of each convex polygon. Optionally, when any two vertexes of any convex polygon in a second area share the same coordinates with two vertexes of any one of the convex polygons in another second area, the two convex polygons can be determined as being adjacent, and thus the two areas are adjacent.

Optionally, the list of adjacent second areas for each second area may include second areas from a same first area, or second areas from different first areas. For example, as shown in FIG. 2, for polygon cluster 1 in area A, the list of adjacent second areas includes polygon cluster 1 and polygon cluster 2 from area B, and polygon cluster 3 from area C. Therefore, there are three records in the list of adjacent second areas for convex polygon cluster 1 of area A, which are (B, 1), (B, 2), (C, 3). In this way, a fine-grained NavMesh is converted to a coarse-grained NavMesh by combining adjacent convex polygons into a plurality of second areas, which allows the game engine to quickly load the coarse-grained NavMesh into the memory when loading a game scene, and thus significantly reduces the amount of data to be recorded. For example, it only needs to load information of all polygon clusters in areas A-D and their adjacent polygon clusters.

In some embodiments, the method 100 further includes: computing a central coordinate for each of the convex polygons, based on coordinates of each of the convex polygons included in each of the second areas; and computing a mean value for the central coordinates of the convex polygons included in each of the second areas, and the mean value is used as the coordinate for each of the second areas, respectively. For example, for polygon cluster 1 in area A, a central coordinate for each of the convex polygons b-e is respectively computed based on the coordinates of convex polygons b-e, and a mean value for the central coordinates of convex polygons b-e is computed, and is used as the coordinate of polygon cluster 1 in area A.

As shown in FIG. 1, the method 100 includes step S104: computing a first path from a first point to a second point, said first path passing through a group of second areas of said plurality of the second areas.

In some embodiments, the method 100 may further include: determining the first area, convex polygon and second area to which said first point belongs, based on the coordinate of said first point; and determining the first area, convex polygon and second area to which said second point belongs, based on the coordinate of said second point. Again, taking FIG. 2 as an example, for point S and point E in the game scene, area A to which point S belongs can be computed, based on the x and z values of the coordinate of point S. For example, convex polygon b to which point S belongs can be computed, by loading the fine-grained NavMesh of area A. Polygon cluster 1 to which point S belongs can be determined, by retrieving the polygon cluster that contains said convex polygon b. Similarly, area D to which point E belongs can be computed, based on the x and z values of the coordinate of point E. For example, convex polygon f to which point E belongs can be computed, by loading the fine-grained NavMesh of area D. Polygon cluster 3 to which point E belongs can be determined, by retrieving the polygon cluster that contains said convex polygon f.

In some embodiments, step S104 includes: computing a first path, from a first point to a second point, that passes through a group of adjacent second areas of said plurality of the second areas, based on the second area to which said first point belongs and the list of adjacent second areas of said second area, the second area to which said second point belongs and the list of adjacent second areas of said second area, and coordinates of each second area. For example, for point S in polygon cluster 1 of area A and point E in polygon cluster 3 of area D, the first path, i.e. (A,1)→(B,1)→(D,3), that passes through a group of adjacent polygon clusters from point S to point E in said game scene is computed, based on polygon cluster 1 of area A to which point S belongs and the second areas adjacent to said polygon cluster 1, i.e. (B,1), (B,2) and (C,3), and polygon cluster 3 of area D to which point E belongs and the second areas adjacent to said polygon cluster 3, i.e. (B,1). Optionally, a heuristic searching algorithm, e.g. A* search algorithm, can be adopted in the computation, in order to compute a path with the lowest cost from a plurality of notes in a graphic plane. A* is a computer algorithm that is widely used in pathfinding and graph traversal, the process of plotting an efficiently directed path between multiple points, called nodes. It enjoys widespread use due to its performance and accuracy.

As shown in FIG. 1, the method 100 includes step S105: computing, based on the first path, a second path from the first point to the second point, said second path passing through a group of convex polygons of said group of second areas. In this way, by means of computing the first path in the coarse-grained NavMesh first and then computing the accurate path in the fine-grained NavMesh based on the first path, both computing amount of the server and space usage of the memory can be significantly decreased, computing time is greatly saved and efficiency of computation is improved.

In some embodiments, step S105 includes: computing a second path from a first point to a second point, said second path passing through a group of adjacent convex polygons of said group of adjacent second areas, said computation is based on said first path, the convex polygon to which said first point belongs, the convex polygon to which said second point belongs, the list of convex polygons that adjacent to the convex polygons in the group of second areas being passed through by said first path, and the central coordinate of each convex polygon.

As shown in FIG. 2, for point S and point E in said game scene, the group of polygon clusters being passed through by the first path is (A,1)→(B,1)→(D,3). In order to acquire an accurate path, the fine-grained NavMesh being passed through by (A,1)→(B,1)→(D,3) can be loaded, including convex polygon b in area A to which point S belongs (recorded as A(b)), convex polygon f in area D to which point E belongs (recorded as D(f)), the list of convex polygons adjacent to the convex polygons in polygon clusters (A,1), (B,1) and (D,3) being passed through by the first path, and the central coordinate of each convex polygon. The second path from said first point to said second point, i.e. S→A(b)→A(e)→B(a)→B(b)→B(c)→D(f)→E can be computed, said second path passing through said group of adjacent convex polygons in said group of adjacent second areas. Optionally, after the second path is acquired, the previously loaded fine-grained NavMesh can be unloaded, so as to reduce memory usage.

In this way, at first, a fine-grained NavMesh can be generated by dividing a game scene into a plurality of first areas and dividing each first area into a plurality of convex polygons as, and then a coarse-grained NavMesh can be generated by combining adjacent convex polygons into a plurality of second areas. Accordingly, when computing a path in the game scene, the accurate path can be acquired merely by loading the coarse-grained NavMesh to get the first path, and next loading the fine-grained NavMesh being passed through by the first path. This remarkably decreases the required consumption of server's memory and computation resources, shortens the computing time to improve computing efficiency, and prevents the game images from getting stuck so as to provide a game scene of high quality.

Exemplary Device

After the methods according to embodiments of the present invention have been introduced, a device for computing a path in a game scene according to embodiments of the present invention will be described with reference to FIG. 3.

Figure 3:
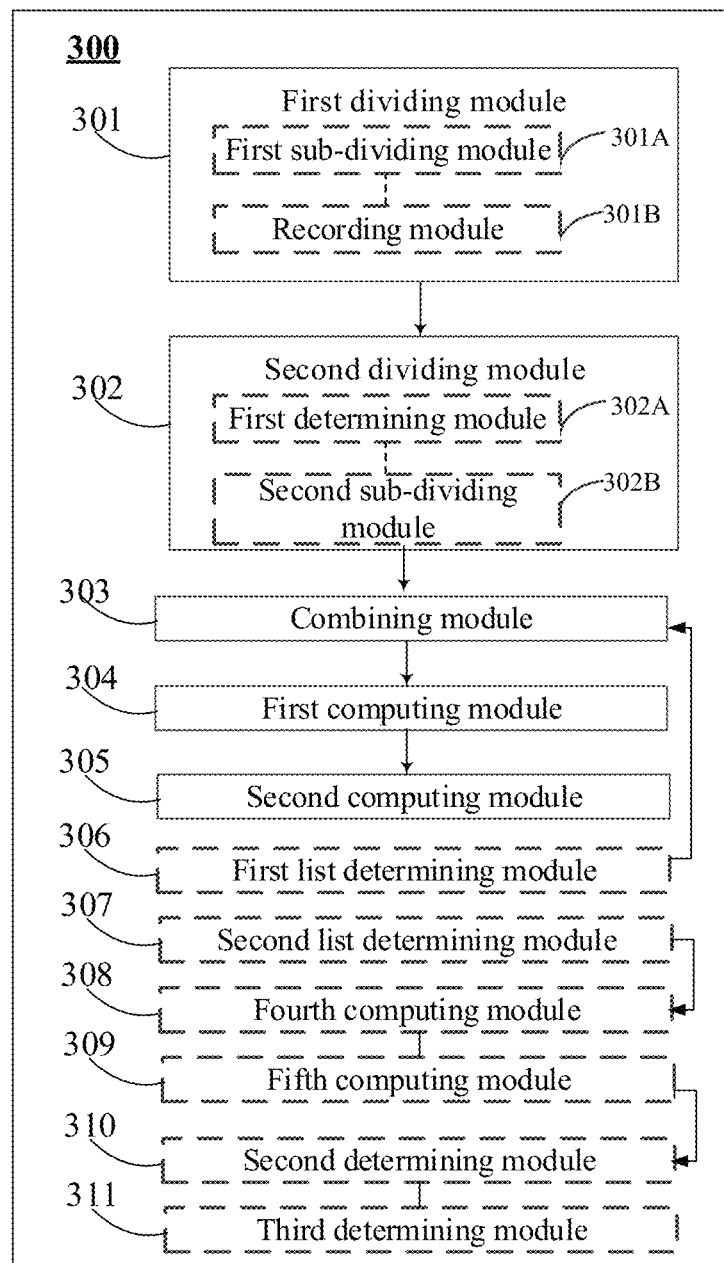
FIG. 3 is a schematic diagram exemplarily illustrating a device for computing a path in a game scene according to an embodiment of the present disclosure.

FIG. 3 is a schematic diagram illustrating a device for computing a path in a game scene according to an embodiment of the present invention. As shown in FIG. 3, the device 300 includes: a first dividing module 301, a second dividing module 302, a combining module 303, a first computing module 304, and a second computing module 305.

In some embodiments, a game scene can be the images that generated based on game plots, and may include character features and/or geographic features. In a game scene, some areas are set as reachable areas, e.g., flat grounds, houses, etc.; while other areas are set as unreachable areas, e.g., mountains, seas, etc. Optionally, a path can be a route in the game scene from one point to another point. Optionally, a path can be a route that can only pass through reachable areas in the game scene.

As shown in FIG. 3, the device 300 includes: a first dividing module 301, configured to divide a game scene into a plurality of first areas.

In some embodiments, the first dividing module 301 includes: a first sub-dividing module 301A, configured to divide said game scene into a plurality of first areas of the same size based on the size of said game scene; and a recording module 301B, configured to record the vertex coordinate of each first area.

For example, for a game scene with a size of 15000 m×10000 m, it is assumed that the large game scene is a space of 15000 m×10000 m, wherein the range of axis x is [0, 15000], and the range of axis z is [0, 10000]. The game scene can be divided into a plurality of first areas of the same size. For example, the game scene can be divided, in the x-z plane, into 150×100 square areas with a same size of 100 m×100 m, such as the four square areas in FIG. 2, i.e. areas A-D. For each first area, if the range of axis y (the height of a game scene) is not considered, the x and z coordinates of the bottom-left corner of each square can be recorded to distinguish the position of each square area in the game scene. Optionally, the first areas can be of other shapes, such as rectangles.

As shown in FIG. 3, said device 300 includes: a second dividing module 302, configured to divide each first area into a plurality of convex polygons based on features of the game scene.

In some embodiments, said features of the game scene include: geographic features and/or character features in the game scene. Optionally, the geographic features may include flat grounds, mountains, seas, houses, etc. in the game scene. Optionally, the character features may be the objects controlled by a user for representing the actions/movement of the user in the game scene.

In some embodiments, said second dividing module 302 includes: a first determining module 302A, configured to determine unreachable areas and reachable areas in each of the first areas, based on the geographic and/or character features of the game scene; and a second sub-dividing module 302B, configured to divide the reachable area in each of the first areas into a plurality of convex polygons.

The first determining module 302A can determine the unreachable and reachable areas in each of the first areas based on geographic features and/or character features of the game scene. Optionally, a character feature may include feature values of a specific character, e.g. height, radius, largest climbable angle of slopes, leg raising height etc. of a character that walking in the game scene. Optionally, a geographic feature may include height, width, depth, or other features of a scene at which a user locates. For example, when the geographic feature of a game scene is a door having a height of 1.5 m, the area at which the door locates is an unreachable area for a character having a height of 2 m. If the radius (or width) of a character is 1 m and the width of an alley (or a narrow street) in the game scene is 0.8 m, the area at which the alley locates is an unreachable area. If the largest climbable angle of slopes of a character is 45 degrees and a cliff is 75 degrees, the area at which the cliff locates is an unreachable area. If the leg raising height of a character is 0.5 m and steps of a stair have a height of 0.7 m, the area at which the stair locates is an unreachable area.

Optionally, a path in a game scene can only pass through reachable areas and cannot pass through unreachable areas. Therefore, in order to compute a path in a game scene, reachable areas in each first area are divided into a plurality of convex polygons, which can be used as a first layer of NavMesh, known as fine-grained NavMesh. For example, the reachable areas of area A can be divided into convex polygons a-g.

In some embodiments, the second dividing module 302 is configured to determine the number of convex polygons being divided in each of first areas, the number of vertexes of each of the convex polygons, and/or the vertex coordinates of each of the convex polygons, based on the geographic and/or character feature of the game scene. Optionally, if the current first area in the game scene is relatively flat, e.g., a plain, the number of vertexes of each of the convex polygons can be set larger, such as a hexagon. If the geographic feature of the current first area in the game scene is relatively complex, e.g., an area with its height changing dramatically, the first area can be divided into triangles in order to record said changes of height. Optionally, the number of convex polygons in each first area and the number of vertexes of each of the convex polygons can be set in advance, for example, the maximum number of vertexes of convex polygons can be set as 6, i.e. the number of vertexes of each of the convex polygons can be a value from 3 to 6.

In some embodiments, the device 300 further includes: a first list determining module 306, configured to: determine a list of adjacent convex polygons for each convex polygon in each of the first areas, based on the number of vertexes of each of the convex polygons and/or the vertex coordinates of each of the convex polygons. As shown in FIG. 2, for convex polygon a in area A, it can be seen from the number of vertexes and/or the vertex coordinates of convex polygon a that, there are no convex polygons in area A that are adjacent to convex polygon a. For convex polygon b in area A, it can be seen from the number of vertexes and/or the vertex coordinates of convex polygon b that, the convex polygons in area A that are adjacent to convex polygon b include convex polygons c and e. For convex polygon c in area A, it can be seen from the number of vertexes and/or the vertex coordinates of convex polygon c that, the convex polygons in area A that are adjacent to convex polygon c include convex polygons b, d and e. For convex polygon e in area A, it can be seen from the number of vertexes and/or the vertex coordinates of convex polygon e that, the convex polygons in area A that are adjacent to convex polygon e include convex polygons b, c and d. The rest can be done in a same manner.

As shown in FIG. 3, the device 300 includes a combining module 303, configured to: combine adjacent convex polygons into a plurality of second areas.

In some embodiments, said combining module 303 is configured to: combine adjacent convex polygons in each of the first areas into a plurality of second areas, based on the determined list of the convex polygons adjacent to each other in each of the first areas.

Optionally, according to the determined list of the convex polygons adjacent to each other in each of the first areas, for example, in area A, convex polygon b is adjacent to convex polygons c and e, convex polygon c is adjacent to convex polygons b, d and e, convex polygons e is adjacent to convex polygon b, c and d, and thus it can be seen that, in area A, the adjacent convex polygons include convex polygons b, c, d and e. Similarly, the adjacent convex polygons further include convex polygons f and g. Thus, area A includes three second areas: polygon cluster 1, including convex polygons b, c, d and e; polygon cluster 2, including convex polygons f and g; and polygon cluster 3, including convex polygon a. Similarly, area B includes three second areas: polygon cluster 1, including convex polygons a-d; polygon cluster 2, including convex polygon g; and polygon cluster 3, including convex polygons e and f. Area C includes three second areas: polygon cluster 1, including convex polygon e; polygon cluster 2, including convex polygons a-d; and polygon cluster 3, including convex polygon f. Area D includes three second areas: polygon cluster 1, including convex polygons b-e; polygon cluster 2, including convex polygon a; and polygon cluster 3, including convex polygon f.

In some embodiments, the device 300 further includes: a second list determining module 307, configured to: determine a list of adjacent second areas for each second area, based on the list of the adjacent convex polygons for each convex polygon in each of the second areas. In some embodiments, the list of the adjacent convex polygons for each convex polygon may also include the number of vertexes and/or the vertex coordinates of each convex polygon. The second list determining module 307 can determine a list of adjacent second areas for each second area based on the number of vertexes and/or the vertex coordinates of each convex polygon. Optionally, when any two vertexes of any convex polygon in a second area share the same coordinates with two vertexes of any one of the convex polygons in another second area, the second list determining module 307 can determine that the two convex polygons are adjacent, and thus the two areas are adjacent.

Optionally, the list of adjacent second areas for each second area may include second areas from a same first area, or second areas from different first areas. For example, as shown in FIG. 2, for polygon cluster 1 in area A, the list of adjacent second areas includes polygon cluster 1 and polygon cluster 2 from area B, and polygon cluster 3 from area C. Therefore, there are three records in the list of adjacent second areas for convex polygon cluster 1 of area A, which are (B, 1), (B, 2), (C, 3). In this way, a fine-grained NavMesh is converted to a coarse-grained NavMesh by combining adjacent convex polygons into a plurality of second areas, which allows the game engine to quickly load the coarse-grained NavMesh to the memory when loading a game scene, and thus significantly reduces the amount of data to be recorded. For example, it only needs to load information of all polygon clusters in area A-D and their adjacent polygon clusters.

In some embodiments, the device 300 further includes: a fourth computing module 308, configured to compute a central coordinate for each of the convex polygons based on coordinates of each of the convex polygons included in each of the second areas; a fifth computing module 309, configured to compute a mean value for the central coordinates of the convex polygons included in each of the second areas, and the mean value is used as the coordinate for each of the second areas, respectively. For example, for polygon cluster 1 in area A, the fourth computing module 308 is configured to respectively compute a central coordinate of each of convex polygons b-e based on the coordinates of convex polygons b-e, and the fifth computing module 309 is configured to compute the mean value of the central coordinates of convex polygons b-e, and the mean value is used as the coordinate of polygon cluster 1 in area A.

As shown in FIG. 3, the device 300 includes a first computing module 304, configured to compute a first path from a first point to a second point, said first path passing through a group of second areas of said plurality of second areas.

In some embodiments, the device 300 further includes: a second determining module 310, configured to determine the first area, convex polygon and second area to which said first point belongs, based on the coordinate of said first point; and a third determining module 311, configured to determine the first area, convex polygon and second area to which said second point belongs, based on the coordinate of said second point. Again, taking FIG. 2 as an example, for point S and point E in the game scene, area A to which point S belongs can be computed, based on the x and z values of the coordinate of point S. For example, convex polygon b to which point S belongs can be computed, by loading the fine-grained NavMesh of area A. Polygon cluster 1 to which point S belongs can be determined, by retrieving the polygon cluster that contains said convex polygon b. Similarly, area D to which point E belongs can be computed, based on the x and z values of the coordinate of point E. For example, convex polygon f to which point E belongs can be computed, by loading the fine-grained NavMesh of area D. Polygon cluster 3 to which point E belongs can be determined, by retrieving the polygon cluster that contains said convex polygon f.

In some embodiments, the first computing module 304 is configured to compute a first path, from a first point to a second point, that passes through a group of adjacent second areas of said plurality of the second areas, based on the second area to which said first point belongs and the list of adjacent second areas of said second area, the second area to which said second point belongs and the list of adjacent second areas of said second area, and the coordinates of each second area. For example, for point S in polygon cluster 1 of area A and point E in polygon cluster 3 of area D, the first path, i.e. (A,1)→(B,1)→(D,3), that passes through a group of adjacent polygon clusters from point S to point E in said game scene is computed, based on polygon cluster 1 of area A to which point S belongs and the second areas adjacent to said polygon cluster 1, i.e. (B,1), (B,2) and (C,3), and polygon cluster 3 of area D to which point E belongs and the second areas adjacent to said polygon cluster 3, i.e. (B,1). Optionally, a heuristic searching algorithm, e.g. A* search algorithm, can be adopted in the computation, in order to compute a path with the lowest cost from a plurality of notes in a graphic plane. A* is a computer algorithm that is widely used in pathfinding and graph traversal, the process of plotting an efficiently directed path between multiple points, called nodes. It enjoys widespread use due to its performance and accuracy.

As shown in FIG. 3, the device 300 includes: a second computing module 305, configured to compute, based on the first path, a second path from the first point to the second point, said second path passing through a group of convex polygons of said group of second areas. In this way, by means of computing the first path in the coarse-grained NavMesh first and then computing the accurate path in the fine-grained NavMesh based on the first path, both computing amount of the server and space usage of the memory can be significantly decreased, computing time is greatly saved and efficiency of computation is improved.

In some embodiments, the second computing module 305 is configured to compute a second path from a first point to a second point, said second path passing through a group of adjacent convex polygons of said group of adjacent second areas, said computation is based on said first path, the convex polygon to which said first point belongs, the convex polygon to which said second point belongs, the list of convex polygons that adjacent to the convex polygons in the group of second areas being passed through by said first path, and the central coordinate of each convex polygon.

As shown in FIG. 2, for point S and point E in said game scene, the group of polygon clusters being passed through by the first path is (A,1)→(B,1)→(D,3). In order to acquire an accurate path, the fine-grained NavMesh being passed through by (A,1)→(B,1)→(D,3) can be loaded, including convex polygon b in area A to which point S belongs (recorded as A(b)), convex polygon f in area D to which point E belongs (recorded as D(f)), the list of convex polygons adjacent to the convex polygons in polygon clusters (A,1), (B,1) and (D,3) being passed through by the first path, and the central coordinate of each convex polygon. The second path from said first point to said second point, i.e. S→A(b)→A(e)→B(a)→B(b)→B(c)→D(f)→E can be computed, said second path passing through said group of adjacent convex polygons in said group of adjacent second areas. Optionally, after the second path is acquired, the previously loaded fine-grained NavMesh can be unloaded, so as to reduce memory usage.

In this way, at first, a fine-grained NavMesh can be generated by dividing a game scene into a plurality of first areas and dividing each first area into a plurality of convex polygons as, and then a coarse-grained NavMesh can be generated by combining adjacent convex polygons into a plurality of second areas. Accordingly, when computing a path in the game scene, the accurate path can be acquired merely by loading the coarse-grained NavMesh to get the first path, and next loading the fine-grained NavMesh being passed through by the first path. This remarkably decreases the required consumption of server's memory and computation resources, shortens the computing time to improve computing efficiency, and prevents the game images from getting stuck so as to provide a game scene of high quality.

Exemplary Device

After the methods and devices according to embodiments of the present invention have been introduced, a device for computing a path in a game scene according to another embodiment of the present invention will be described.

Technicians in this field can understand that each aspect of the present disclosure can be implemented as systems, methods or program products. Therefore, the disclosure can be specifically implemented in hardware, software (including firmware, resident software, microcode etc.) or a combination thereof, which generally can be called as "circuit", "module", or "system".

In some embodiments, the device for computing a path in a game scene according to the present invention at least includes: at least one processing unit and at least one storage unit. In some embodiments, the storage unit stores program code, and when said program code is processed by the processing unit, the processing unit will process the steps included in the method for computing a path in a game scene according to embodiments of present invention as described in "Exemplary Method". For example, the processing unit can process the following steps: step S101, dividing the game scene into a plurality of first areas; step S102, dividing each of the first areas into a plurality of convex polygons, based on features of the game scene; step S103, combining adjacent convex polygons into a plurality of second areas; step S104, computing a first path from a first point to a second point, said first path passing through a group of second areas of said plurality of second areas; and step S105, computing, based on the first path, a second path from the first point to the second point, said second path passing through a group of convex polygons of said group of second areas.

Next, a device 10 for computing a path in a game scene according to the present invention is described with reference to FIG. 4. The device 10 for computing a path in a game scene as shown in FIG. 4 is merely illustrative, and brings no limitation on functions and scopes of embodiments of the present invention.

Figure 4:
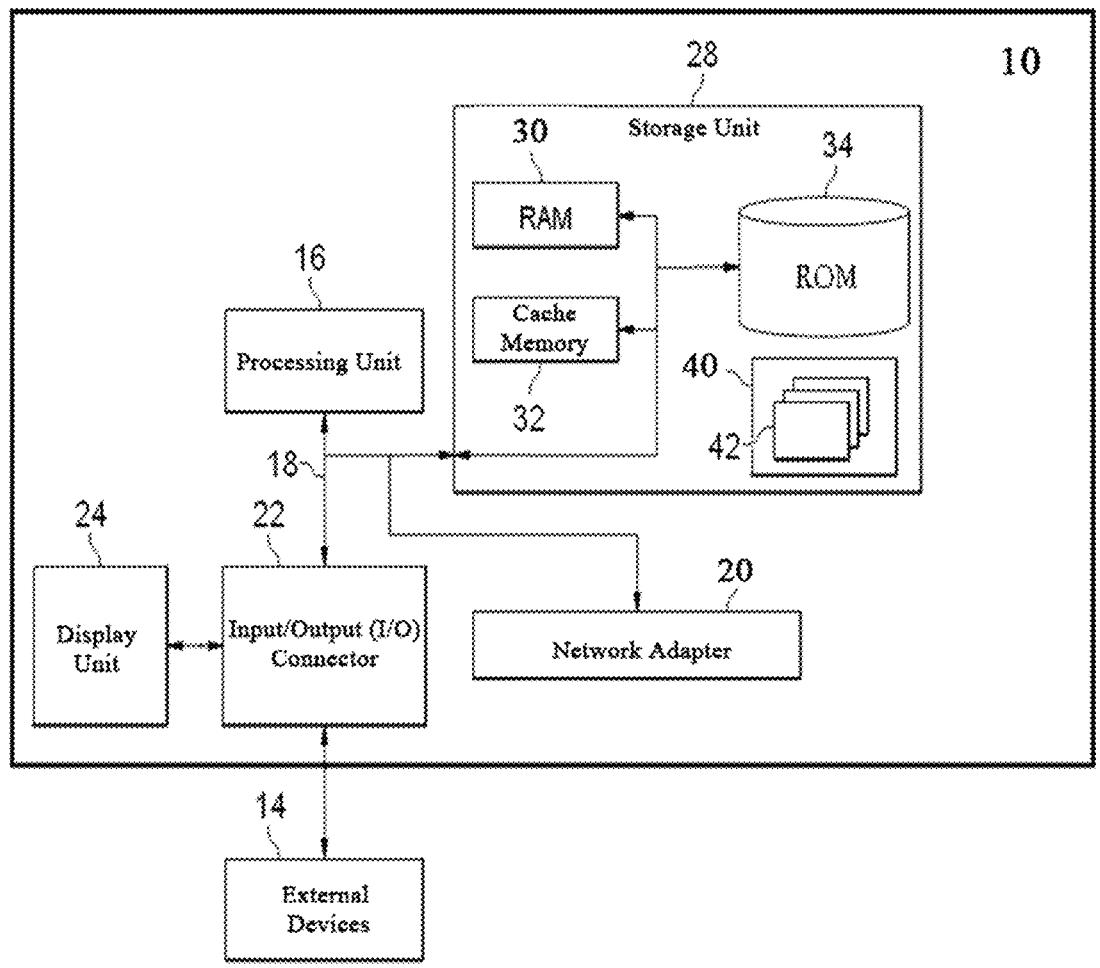
FIG. 4 is a schematic diagram exemplarily illustrating a device for computing a path in a game scene according to another embodiment of the present disclosure.

As shown in FIG. 4, the device 10 for computing a path in a game scene can be represented as a general purpose computing device. The components of the device 10 for computing a path in a game scene include but is not limited to: said at least one processing unit 16, said at least one storage unit 28, a bus 18 connecting different system components (including the processing unit 16 and storage unit 28).

The bus 18 represents one or more of several types of bus structures, including a memory bus or memory controller, a peripheral bus, a graphics acceleration port, a processor, or a local bus using any of a variety of bus structures.

The storage unit 28 may include a readable medium in the form of a volatile memory, such as a random access memory (RAM) 30 and/or a cache memory 32, and further, a read only memory (ROM) 34.

The storage unit 28 may also include a program/utility tool 40 having a set of (at least one) program modules 42, which include but not limited to, an operating system, one or more application programs, other program modules and program data. Each of these examples or combinations thereof may include an implementation of the network environment.

The device 10 for computing a path in a game scene may also communicate with one or more external devices 14, such as a keyboard, pointing device, Bluetooth device, etc., and may also communicate with one or more devices that enable a user to communicate with the device 10, and/or any device (e.g., a router, a modem, etc.) that enables the device 10 to communicate with one or more other computing devices. Such communication may be performed through an input/output (I/O) interface 22. Also, the device 10 for computing a path in a game scene may also communicate via a network adapter 20 with one or more networks, such as a local area network (LAN), a wide area network (WAN), and/or a public network e.g. the Internet. As shown, the network adapter 20 communicates with other modules of the device 10 for computing a path in a game scene over the bus 18. It should be understood that, although not shown in the figures, other hardware and/or software modules may be used in conjunction with device 10 for computing a path in a game scene, including, but not limited to, microcode, a device driver, a redundant processing unit, an external disk drive array, a RAID system, a tape drive, and a data backup storage system etc.

Exemplary Program Product

In some embodiments, various aspects of the present invention may also be embodied in the form of a program product e.g. program code. When a program product is running on a terminal device, the program code may cause the device to process the steps included in the method for computing a path in a game scene according to embodiments of present invention as described in "Exemplary Method". For example, the processing unit can process the following steps as illustrated in FIG. 1: step S101, dividing the game scene into a plurality of first areas; step S102, dividing each of the first areas into a plurality of convex polygons, based on features of the game scene; step S103, combining adjacent convex polygons into a plurality of second areas; step S104, computing a first path from a first point to a second point, said first path passing through a group of second areas of said plurality of second areas; and step S105, computing, based on the first path, a second path from the first point to the second point, said second path passing through a group of convex polygons of said group of second areas.

The program product may employ any combination of one or more readable media. A readable medium may be a readable signal medium or a readable storage medium. A readable storage medium may be, but not limited to, an electrical, magnetic, optical, electromagnetic, infrared, or semiconductor system, apparatus or device, or any combination thereof. A more specific example (a non-exhaustive list) of a readable storage medium includes an electrical connection having one or more wires, a portable disk, a hard disk, a random access memory (RAM), a read only memory (ROM) (EPROM or flash memory), an optical fiber, a portable compact disk read only memory (CD-ROM), an optical storage device, a magnetic storage device, or any suitable combination thereof.

Figure 5:
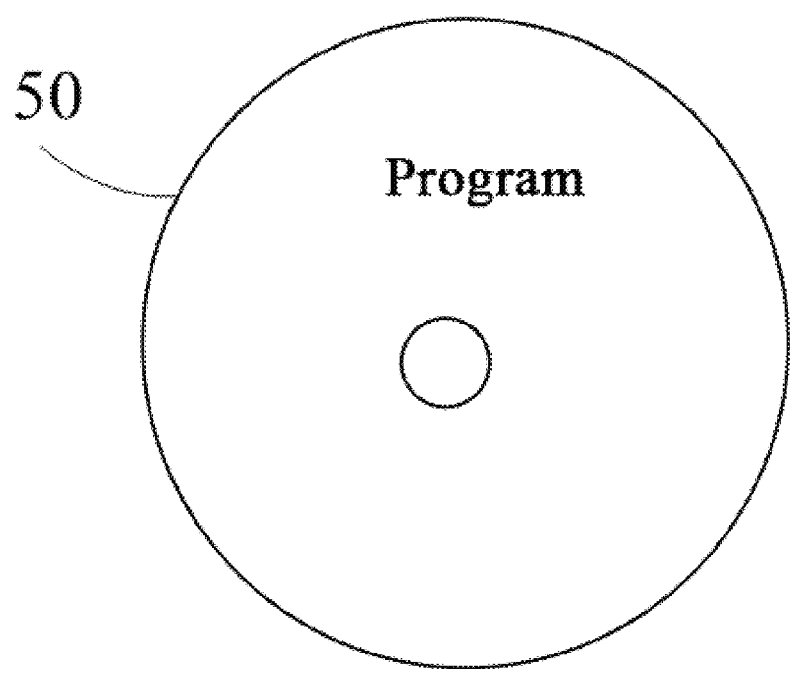
FIG. 5 exemplarily illustrates a program product for computing a path in a game scene according to another embodiment of the present disclosure.

As shown in FIG. 5, a program product 50 for computing a path in a game scene according to an embodiment of the present invention is described. The program product 50 may employ a portable compact disk read only memory (CD-ROM), and may include program code. In addition, the program product 50 may run on a terminal device, such as a personal computer. However, the program product of the present invention is not limited to such embodiments. In the present application, a readable storage medium may be any tangible medium that contains or stores a program that can be used by or in connection with an instruction execution system, apparatus, or device.

A readable signal medium may include a data signal that is propagated in or as part of a carrier, and the readable signal medium carries readable program code. Such propagated data signal may take a variety of forms, including but not limited to, an electromagnetic signal, an optical signal, or any suitable combination thereof. A readable signal medium may also be any readable medium other than a readable storage medium, and such readable medium may send, propagate, or transmit a program for use by or in connection with an instruction executing system, apparatus, or device.

Program codes included in a readable medium may be transmitted by any suitable medium, including but not limited to, wireless or wired mediums, optical cables, RF etc., or any suitable combination thereof.

Program codes for performing the operations of the present invention may be programmed by any combination of one or more programming languages, including object-oriented programming languages such as Java, C++ etc., and conventional procedural programming languages such as "C" language or other similar programming languages. The program code may be executed entirely on a user computing device, partially on a user device, as a standalone software package, partly on a user computing device and partly on a remote computing device, or entirely on a remote computing device or server. In the case of a remote computing device, the remote computing device may be connected to a user computing device through any kind of networks, including a local area network (LAN) or a wide area network (WAN), or may be connected to an external computing device (e.g., connected via the Internet using Internet Service Providers).

It should be noted that, although a number of devices or sub-devices for a method for computing a path in a game scene are mentioned in the detailed description above, this division is not mandatory. Indeed, the features and functions of the two or more devices described above may be embodied in one device in accordance with an embodiment of the present invention. Conversely, the features and functions of the one device described above can be further divided into a plurality of devices.

In addition, although the operation of the method of the present invention is described in a specific order in the drawings, this does not require or imply that these operations must be performed in that particular order, or that all of the operations shown must be performed to achieve the desired result. Additionally or optionally, some steps may be omitted, a plurality of steps may be combined into one step, and/or one step may be decomposed into multiple steps for execution.

While the spirit and principle of the present invention have been described with reference to a number of specific embodiments, it is to be understood that the invention is not limited to the specific embodiments disclosed. The division of aspects does not imply that features in these aspects cannot be combined to achieve benefits. The division is only for the convenience of expression. It is intended that the present invention cover the modifications and equivalent arrangements included within the spirit and scope of the appended claims.

The invention claimed is:

1. A method for computing a path in a game scene, the path being from a point to another different point in the game scene, the method comprising:
   dividing the game scene into a plurality of first areas;
   dividing each of the first areas into a plurality of convex polygons, based on features of the game scene, wherein the features of the game scene comprise: geographic features and character features, wherein the step of dividing each of the first areas into a plurality of convex polygons based on the features of the game scene comprises:
      determining unreachable areas and reachable areas in each of the first areas, based on the geographic features and character features of the game scene; and
      dividing the reachable area in each of the first areas into a plurality of convex polygons;
   for each of the first areas, combining adjacent convex polygons of said plurality of convex polygons within the first area to obtain a plurality of second areas in the first area, such that a set of second areas are obtained for the same scene;

computing a first path, said first path starting from a first point to a second point and passing through a group of second areas of said set of second areas; and computing a second path based on the first path, said second path starting from the first point to the second point and passing through a group of convex polygons of said group of second areas.

2. The method of claim 1, wherein the step of dividing the game scene into the plurality of first areas comprises:

dividing the game scene into a plurality of first areas of the same size, based on the size of the game scene; and recording vertex coordinates of each of the plurality of first areas.

3. The method of claim 1, wherein the step of dividing the game scene into the plurality of first areas based on the features of the game scene comprises:

determining the number of convex polygons being divided in each of the first areas, the number of vertexes of each of the convex polygons, and/or the vertex coordinates of each of the convex polygons, based on the geographic features and/or character features of the game scene.

4. The method of claim 3, further comprising:

determining a list of adjacent convex polygons for each convex polygon in each of the first areas, based on the number of vertexes of each of the convex polygons and/or the vertex coordinates of each of the convex polygons.

5. The method of claim 4, wherein the step of combining adjacent convex polygons into the plurality of second areas comprises:

combining adjacent convex polygons in each of the first areas into a plurality of second areas, based on the determined list of adjacent convex polygons for each convex polygon in each of the first areas.

6. The method of claim 5, further comprising:

determining a list of adjacent second areas for each second area, based on the list of the adjacent convex polygons for each convex polygon in each of the second areas.

7. The method of claim 6, further comprising:

computing a central coordinate for each of the convex polygons, based on coordinates of each of the convex polygons included in each of the second areas; and computing a mean value for the central coordinates of the convex polygons included in each of the second areas, wherein the mean value is used as the coordinate for respective second area.

8. A device for computing a path in a game scene, the path being from a point to another different point in the game scene, the device comprising:

a first dividing module configured to divide the game scene into a plurality of first areas;

a second dividing module configured to divide each of the first areas into a plurality of convex polygons, based on features of the game scene, wherein the features of the game scene comprise: geographic features and character features, wherein the second dividing module is further configured to:

determine unreachable areas and reachable areas in each of the first areas, based on the geographic features and character features of the game scene; and divide the reachable area in each of the first areas into a plurality of convex polygons;

a combining module configured to, for each of the first areas, combine adjacent convex polygons of said plurality of convex polygons within the first area to obtain a plurality of second areas in the first area, such that a set of second areas are obtained for the same scene;

a first computing module configured to compute a first path, said first path starting from a first point to a second point and passing through a group of second areas of said set of second areas; and a second computing module configured to compute a second path based on the first path, said second path starting from the first point to the second point and passing through a group of convex polygons of said group of second areas.

9. A non-transitory computer readable storage medium for storing a program of instructions executable by a computer to perform a process, the process being used for computing a path in a game scene, the path being from a point to another different point in the game scene, the process comprising:

dividing the game scene into a plurality of first areas;

dividing each of the first areas into a plurality of convex polygons, based on features of the game scene, wherein the features of the game scene comprise: geographic features and character features, wherein the step of dividing each of the first areas into a plurality of convex polygons based on the features of the game scene comprises:

determining unreachable areas and reachable areas in each of the first areas, based on the geographic features and character features of the game scene; and dividing the reachable area in each of the first areas into a plurality of convex polygons;

for each of the first areas, combining adjacent convex polygons of said plurality of convex polygons within the first area to obtain a plurality of second areas in the first area, such that a set of second areas are obtained for the same scene;

computing a first path, said first path starting from a first point to a second point and passing through a group of second areas of said set of second areas; and computing a second path based on the first path, said second path starting from the first point to the second point and passing through a group of convex polygons of said group of second areas.

* * * * *